Aug. 1, 1933.  F. N. BARD  1,920,545
PIPE COUPLING
Filed Sept. 8, 1930
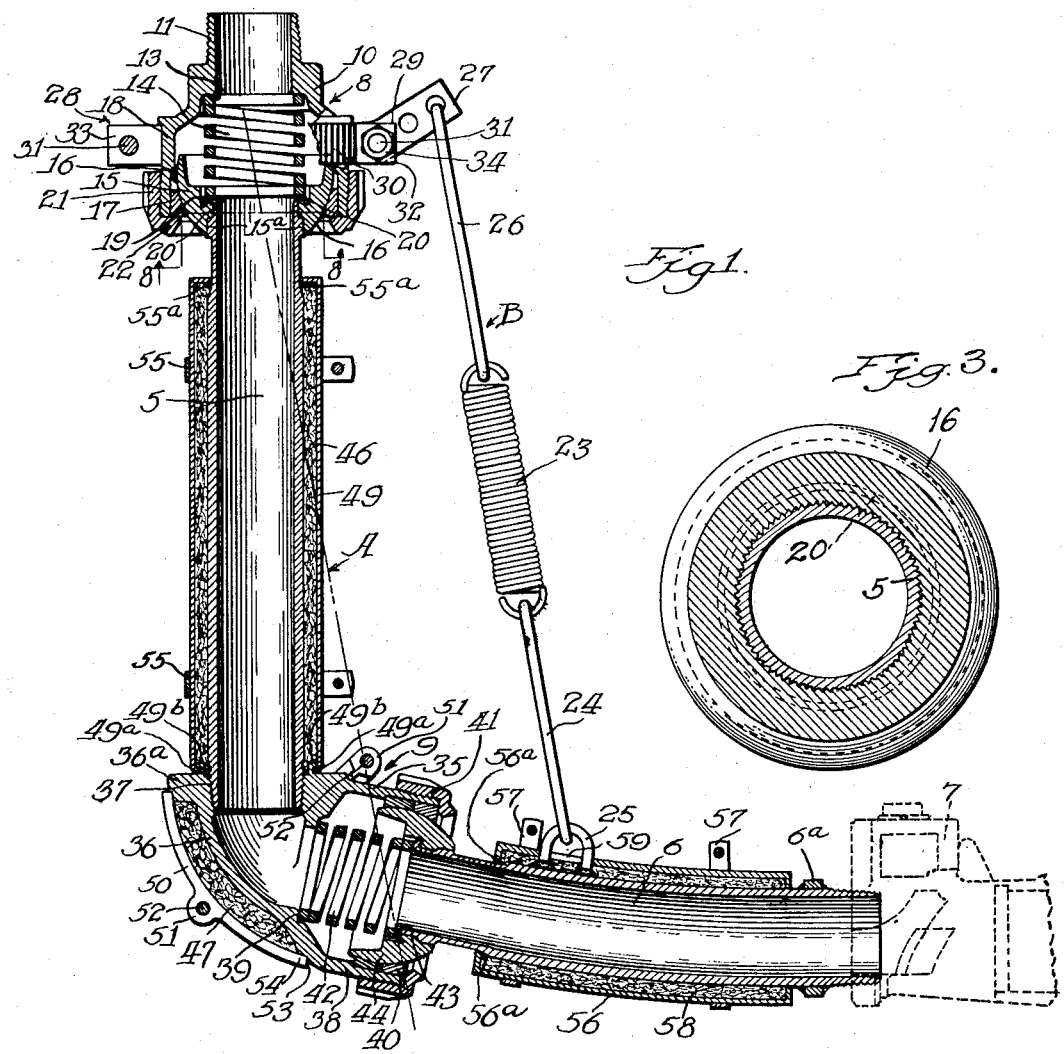
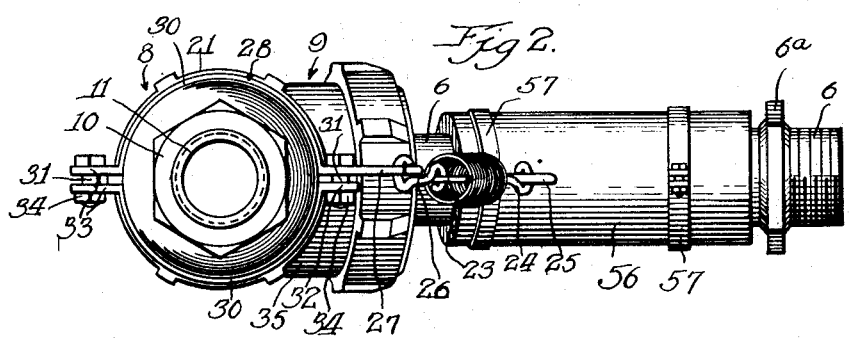
Witness:
R. B. Davison
Inventor:
Francis Norwood Bard
By Attorney
Carl Carpenter Patented Aug. 1, 1933

1,920,545

UNITED STATES PATENT OFFICE 1,920,545

PIPE COUPLING

Francis Norwood Bard, Highland Park, Ill.

Application September 8, 1930. Serial No. 480,287

5 Claims. (Cl. 285—91)

This invention relates to flexible metallic piping structures of the ball-jointed type. More particularly the invention has reference to the mode of attaching the ball member of a metallic ball pipe joint to the end of the pipe section on which the ball member is affixed. The invention provides a novel mode and means of attachment whereby the ball member is rigidly secured to its pipe section in an exceedingly practicable and reliable manner.

While the invention is described and illustrated for use in connection with train pipe couplings, it will be understood that the invention finds a wide field of utility for other analogous purposes.

In the accompanying drawing,

Figure 1 is a sectional view of one form of device embodying this invention;

Figure 2 is an elevational plan view of the same;

Figure 3 is an enlarged transverse sectional view taken on the line 8—8 of Figure 1, looking in the direction indicated by the arrows;

Referring now more particularly to the drawing and the form of the invention shown in Figures 1 and 2, I provide a pipe coupling in the nature of a flexible conduit having flexibly connected rigid sections. In the form shown in Figure 1, the pipe coupling itself includes two relatively angularly displaceable pipe sections 5 and 6, which, in their normal position, say, for example, when employed as a coupling between the cars of a railroad train, is generally that shown in Figure 1, that is, the pipe section 5 is generally vertical and the pipe section 6 generally horizontal so that the companion coupling on an adjoining car when connected by a coupler head, such as indicated in dotted lines 7, will form substantially a parallelogram so that any movement of the pipe sections 5 about the suspending joint therefor will result in a movement of the pipe section 6 away from the track.

The pipe section 5 is suspended from the car by a pipe joint, generally designated 8, constructed as hereinafter described. As shown in Figure 1, the pipe section 6 is flexibly connected to the pipe section 5 by a joint, generally designated 9, constructed as hereinafter described.

Referring to the joint 8, the latter includes a casing 10 provided with an axially externally threaded sleeve 11, which engages with the downwardly extending end valve or fitting of the train pipe attached to the railway car, the sleeve 11 being of smaller diameter than the casing 10 so as to form an annular shoulder 13 against which one end of a helical spring 14 abuts.

The pipe section 5 is provided at one end but separate therefrom with a hemispherical ball portion 15, which is secured to the pipe section 5 by construction hereinafter described. The ball portion 15 is provided with a spherical outer surface 16, which engages annular packing 17 of any suitable material lying within the cylindrical wall 18 of the casing 10.

The ball member 15 is secured to the pipe section 5 in the following manner: the external surface of the pipe adjacent to one end is provided with an annular abutment 15a which engages a complemental recess in the bore of the ball member thus preventing longitudinal movement of the ball member on the pipe in one direction. The ball is additionally provided with an internal annular flange forming an outwardly facing groove 19, and the adjacent end edge of the pipe is annularly spun to form a lip 20 overlying the ball and engaging the groove 19, thus affixing the ball to the pipe section and forming a fluid tight joint. Upon reference to Figure 3, it will be seen that the internal portion of the ball between the groove 19 and the part engaging the abutment 15a is longitudinally toothed, and said ball, being of relatively harder material than that of the pipe section, will, when the latter is driven into the ball, form an interlocking engagement therewith preventing their relative rotation. Thereupon the lip 20 is bent over completing the fixed joint between the pipe and said ball. The helical spring 14 abuts said lip. This spring serves the twofold function of tending to center the pipe 5, that is, tending to bring it into alignment with the axis of the sleeve 11 and also for maintaining the ball surface 16 in immediate contact with the complemental surface of the packing 17. A nut 21 having an annular flange 22 retains the packing gasket 17 in position, and thus a fluid-tight flexible joint is provided.

In order to prevent the pipe section 6 from dropping down and striking the rails, I provide supporting means therefor which, in the present instance, includes a helical spring 23 of sufficient strength to normally support the pipe section 6 in a substantially horizontal plane. The spring 23 is connected by a link 24 to a connecting eye 25, which latter has its ends welded to the pipe section 6. Of course, any other mode of connection might be employed, if desired.

The other end of the spring 23 is connected by a link 26 to the radially extending arm 27 of the bracket 28, said bracket including clamping portions 30 which encircle the wall 18 of the casing 10 near the upper portion thereof and is drawn into clamping engagement therewith by the provision of the bolt 31 extending through the arm 27 and through a complemental lug 32 and a similar bolt 31 extending through lugs 33, retaining nuts 34 serving to maintain the gripping engagement of the ring 30 with the wall 18. In order to prevent, due to vibration of the parts, relative rotation of the ring 30 on the wall 18, the ring and said wall may be serrated, as illustrated and described elsewhere herein.

Referring now to the pipe joint 9, I find for convenience that the axis of this joint should be substantially inclined to the horizontal as shown and to facilitate this arrangement I provide a casing 35 having a curved extension 36 internally threaded as at 37 for engagement with the lower end of the pipe section 5. The casing 35 is substantially the same construction as the casing 10, that is, it is provided with a cylindrical wall 38, a spring seat 39 at the inner end thereof and a packing 40 at the outer end, which said packing is retained by a nut 41 of substantially the same construction as that shown in the joint 8. A helical spring 42 is engaged with the shoulder 39 and with the lip 43 provided where pipe 6 engages in ball member 44, which latter is secured to and forms a part of the pipe section 6 in the manner already described.

To facilitate application or removal of the coupler head 7 on the pipe 6, the latter is provided with a polygonal portion 6a to which may be applied a wrench for holding the same while applying or removing the coupler head.

It will be observed that the disposition of the axis of the casing 38 at an inclination to the horizontal, as shown in Figure 1 requires that the pipe section 6 be curved so that its ball end will, in normal position be in alignment with the axis of the casing 38. However, the outer end of the pipe section 6, it will be noted, is normally, both when connected and disconnected with a mating flexible pipe, disposed substantially horizontally. Upon inspection of Figures 1 and 2, and a comparison with Figure 4, it will be noted that in flexing through a horizontal plane the distance to which the spring 23 must stretch is less by the provision of the inclined casing 38 and curved portion of the pipe 6. This not only increases the life of the spring, but, as well, prevents the latter from exerting such upward force on the pipe section 6 as to cause it to become accidentally uncoupled from the mating conduit.

The sections 5 and 6 of the pipe coupling and the joint 9 are protected against damage and against heat radiation by the provision of the heat insulating covering and containing shells therefor. The section 5 and joint 9 are protected by heat insulating coverings 46 and 47, which are contained in shells or casings 49 and 50, which conform generally to the contour of the pipe and to that of the curved portion 36 of the joint 9. The casing 50 is preferably a casting or punching formed in two half portions provided with lugs 51, 51, through which bolts 52, 52 may pass for clamping the casing 50 about the curved portion 36.

A shoulder 53 is provided on the casing 38 against which the end 54 of the casing 50 engages to prevent displacement of said casing. The upper portion of the curved portion 36 is provided with an external flange 36a on which the adjacent portion of the casing 50 lies, thus retaining the insulation 47 in position. The shell 49 is held in position by a plurality of straps or bands 55, which encircle said casing 49 and maintain the latter and the insulating material 46 in position on the pipe section. The pipe section 6 is insulated similarly to the pipe section 5 in that it is provided with an encompassing casing 56 secured by straps 57 and containing a heat insulating material 58. A slot 59 is provided in the casing 56 to accommodate the connecting clip 25. The casings 49 and 56 may be formed in two sections or may be rolled about the insulating material, as desired.

It will be observed that in Figure 1 the casing 49 is prevented against longitudinal movement on the pipe section 5 by the clamping engagement of the bands 55, and by forming an annular flange 49a on the casing engaging in a channel 49b formed on the joint casing curved portion 36, and by the shoulder 55a on the pipe 5. The casing 56 and its insulating contents are prevented from movement on the pipe 6 by the clip 25 passing therethrough, and by forming a shoulder 56a on the pipe 6.

It will also be observed that the line A drawn between the centers of movement of the ball joints 8 and 9 is substantially parallel to the axis B of the support comprising the spring 23 and links 24 and 26, thus furthering the purpose of relieving strain on these elements.

Having thus described my invention and illustrated its use, what I claim as new and desire to secure by Letters Patent is:

1. The method of making a pipe and ball member of a ball joint, which includes providing a ball member with a longitudinally toothed axial aperture, hardening said ball member, driving the pipe member into said toothed aperture to cause a portion to project beyond the inner ends of said teeth within the ball, and then bending the projecting portion into engagement with the adjacent portion of the ball.

2. A flexible pipe structure having a ball pipe joint between adjoining sections thereof, said joint comprising ball and casing members on the respective sections and a ball-seating gasket retained in said casing member, said ball member being a hard metal part fitted on the end of the pipe section which carries it, said pipe section having an external annular shoulder and the bore of the ball member having an internal shoulder which abuts against said shoulder on said pipe section, the said shoulder of the ball member being between the shoulder on the pipe section and the extreme end of said pipe section, said ball member being formed to provide an annular groove around its said shoulder at the side thereof adjacent said extreme end of said pipe section, and said extreme end of said pipe section being swaged over said shoulder of the ball member, whereby the ball member is secured fast on said pipe section.

3. In a metallic ball pipe joint, a ball member having an axial bore, a pipe section on the end portion of which said ball member is secured with a driving fit, said ball member being of harder metal than the pipe section and having its bore formed with longitudinal teeth biting into the metal of the pipe section, and the end of the pipe section being swaged in engagement with the ball member.

4. In a metallic ball pipe joint, a ball member having an axial bore, a pipe section in the end portion of which said ball member is secured with a driving fit, said parts having abutting shoulders and the end of said pipe section being swaged over the shoulder of the ball member, one of said parts being of hardened metal and having longitudinal grooves biting into the metal of the other.

5. In a metallic ball pipe joint, a ball member having an axial bore, a pipe section on the end portion of which said ball member is secured with a driving fit, said parts having abutting shoulders and the end of said pipe section being swaged over the shoulder of the ball member, one of said parts having longitudinal grooves biting into the metal of the other.

FRANCIS NORWOOD BARD.